United States Patent [19]

Walker

[11] 4,139,854
[45] Feb. 13, 1979

[54] VARIABLE TEMPERATURE RECORDING STYLUS
[75] Inventor: Richard L. Walker, Amherst, N.H.
[73] Assignee: M.F.E., Inc., Salem, N.H.
[21] Appl. No.: 853,128
[22] Filed: Nov. 21, 1977
[51] Int. Cl.² ............................................. G01D 15/10
[52] U.S. Cl. .................................... 346/76 R; 219/216
[58] Field of Search ............... 346/76 L, 136; 219/216
[56] References Cited
U.S. PATENT DOCUMENTS

| | | | |
|---|---|---|---|
| 2,644,738 | 7/1953 | Gardner | 346/76 R |
| 3,813,677 | 5/1974 | Shimotsuma | 346/76 R |
| 4,027,311 | 5/1977 | Ambrosio | 346/76 R |

Primary Examiner—Joseph W. Hartary
Attorney, Agent, or Firm—Cesari and McKenna

[57] ABSTRACT

The resistive stylus in a thermographic strip chart recorder is connected by way of an adjustable selector switch to taps of an auxiliary secondary winding added to the D.C. inverter customarily used to power the recorder's pen motor. The amount of current to the stylus and thus the stylus temperature may be varied in accordance with recorder chart speed by adjusting the selector switch to connect the desired number of secondary winding turns to the stylus.

6 Claims, 1 Drawing Figure

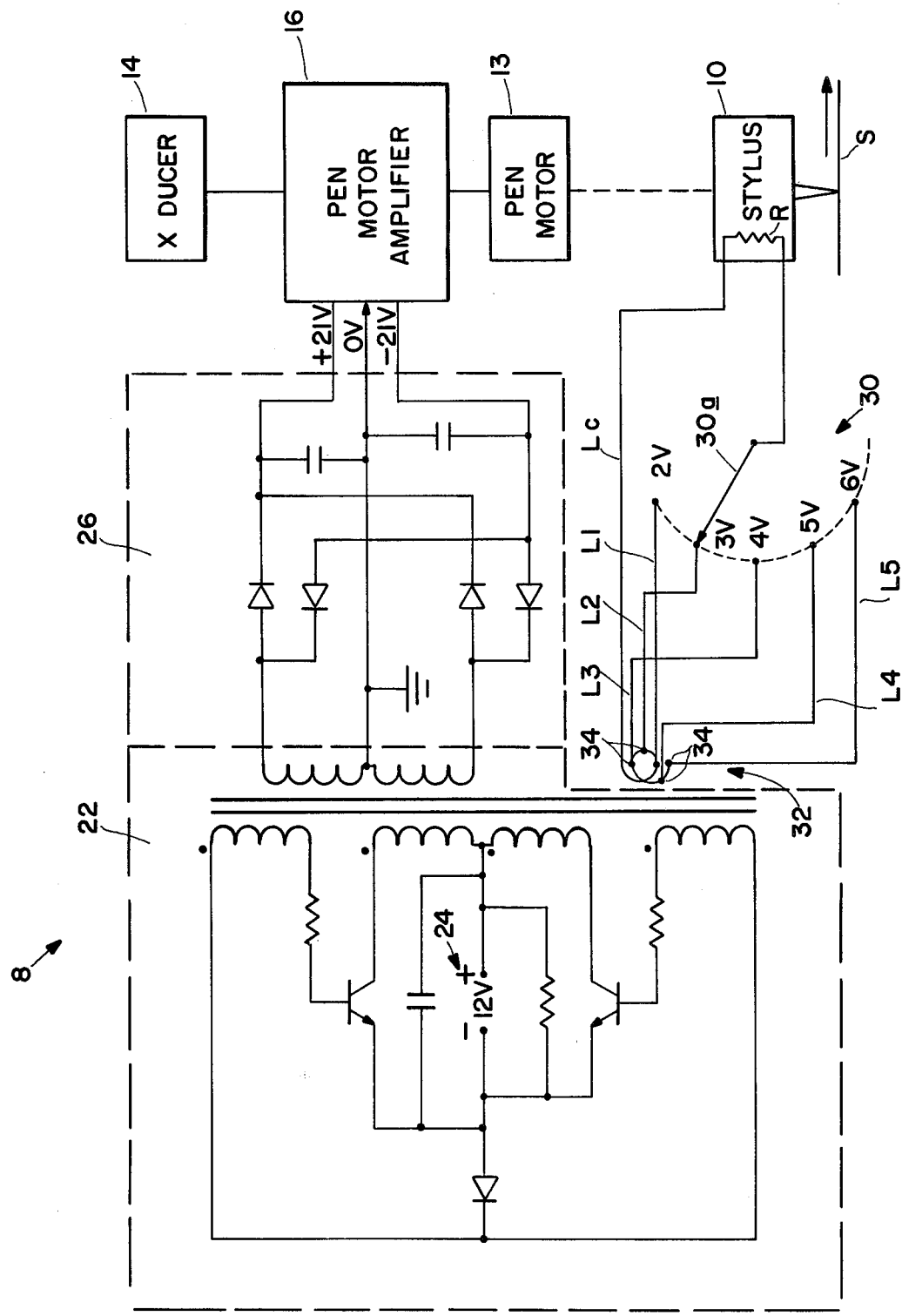

VARIABLE TEMPERATURE RECORDING STYLUS

BACKGROUND OF THE INVENTION

This invention relates to a thermographic strip chart recorder. It relates more particularly to a variable temperature stylus for use in recorders of this type.

In thermographic recorders, a strip of chart paper is advanced past a heated recording stylus. Simultaneously, the stylus is moved in a direction generally perpendicular to the strip advance by means of a pen motor in accordance with output signals from a sensing transducer of some kind. The chart paper is chemically treated so that its color changes where it is engaged by the heated stylus. Resultantly, a visible track is formed on the paper strip which reflects the instantaneous value of the condition being sensed.

For example, the recorder may receive the output of a pressure transducer connected to a patient's wrist and thus indicate changes in the patient's pulse rate with time. As another example, the recorder may receive the output of a sonar transponder so that the graph on the strip reflects changes in ocean depth along a particular track followed by a ship, the advance of the strip corresponding to the ship's advance along the track.

Most recorders include provision for selecting different chart speeds for scaling purposes. It is a characteristic of thermographic recorders that the discoloration of the chemically treated paper by the heated stylus varies with chart speed. That is, if the paper strip advances relatively slowly, the heated stylus spends more time at a given location on the paper and therefore the paper is heated to a greater extent resulting in a relatively dark trace at that location. Conversely, as the paper speed increases, it is heated to a lesser extent by the stylus at each location and is therefore lighter and less visible. Of course, it is desirable for the chart track to be uniformly dark at all chart speeds. Accordingly invariably provision is also made for varying the temperature of the stylus depending upon the speed of the advancing chart paper so that the trace on the chart is clearly visible at all times.

Conventional recorders of this general type are usually powered by a D.C. power supply that produces, typically, 12 volts and its stylus requires about 6 watts maximum power, e.g. 2 volts at 3 amperes, to provide a distinct trace. Current to the stylus is often applied by way of a variable power resistor or potentiometer which can be adjusted to vary the power applied to the stylus from a maximum of of 6 watts required at maximum chart speed through one or more intermediate settings to a minimum of about 2 watts required at the slowest chart speed. This means that at chart speeds other than maximum speed, part of the power developed by the D.C. supply is dissipated as heat in the potentiometer and is, therefore, wasted. Furthermore, the temperature of the stylus cannot be controlled as precisely as one might want using variable resistance controls of that type.

SUMMARY OF THE INVENTION

Accordingly, it is an object of the present invention to provide a variable temperature stylus for a thermographic recorder which achieves precise control of stylus temperature.

Another object of the invention is to provide a variable temperature stylus of this type which is relatively highly efficient.

Still another object of the invention is to provide a variable temperature stylus which draws a minimum amount of power from the power supply at all temperature settings within a selected temperature range.

Other objects will be in part be obvious will in part appear hereinafter.

The invention accordingly comprises the features of construction, combination of elements and arrangements of parts as will be exemplified in the following detailed description, and the scope of the invention will be indicated in the claims.

Briefly, instead of powering the stylus in a thermographic recorder by way of a variable power resistor or potentiometer, in my arrangement the stylus is connected by way of a selector switch to a set of taps on an auxiliary secondary winding added to the inverter transformer usually used to provide power for the stylus pen motor in recorders of this type. This approach is made practical because instead of using a standard transformer, a conventional "cross-type" pot core transformer is employed and provided with the auxiliary winding. In this type of transformer, the windings are wound around a core centered in a "birdcage" having four "bars" distributed around a circle. Consequently, the secondary winding including the auxiliary windings are accessible between the bars at the quarter points of each winding turn. Thus, the taps on the auxiliary winding can be precisely positioned around a given turn to provide exactly the proper voltage for the stylus.

Adjustment of the selector switch connects the stylus to different taps on that auxiliary winding. Since the current applied to the stylus depends upon the number of winding turns connected to the stylus, adjustment of the selector switch between its different settings varies the current to the stylus and thus the stylus temperature between precisely defined temperature values over a given temperature range required to accommodate the customary range of chart speeds.

Thus, when the selector switch connects the stylus to a particular tap on the auxiliary winding to heat the stylus to a given temperature, only the precise amount of power is delivered to the stylus to maintain the stylus at that given temperature. There is no loss in efficiency due to heat dissipation in any resistive component of the system as is the case in prior comparable thermographic recorders.

Furthermore, the selector switch of the present invention is much less prone to failure than a potentiometer or a variable resistor. Therefore, the variable temperature stylus recorder of the present invention should suffer less downtime than its conventional counterparts.

BRIEF DESCRIPTION OF THE DRAWING

For a fuller understanding of the nature and objects of the invention, reference should be had to the following detailed description, taken in connection with the accompanying drawing which is a schematic and block diagram of a variable temperature stylus embodying the features of this invention shown incorporated into the power supply section of a conventional thermographic recorder.

DESCRIPTION OF THE PREFERRED EMBODIMENT

Referring now the drawing figure, in a thermographic recorder shown generally at 8, a stylus 10 engages a strip S of chemically treated paper that is advanced past the stylus. The speed of the paper advance can be varied by any conventional means to adjust the time base of the strip chart. Stylus 10 is moved in a direction generally perpendicular to the direction of paper advance by a pen motor 13 connected to the stylus. Motor 13 is, in turn, driven by the output signal from a transducer 14 which is applied to the motor by way of an amplifier 16. Transducer 14 may be of the type that responds to pressure, or temperature or any one of a number of phenomena depending upon the particular application. In any event, the stronger the output signal from the transducer, the greater the angular excursion of motor 13 and thus the greater the amplitude of the graph being traced on strip S.

In recorders of this type, the pen motor amplifier 16 normally requires polarized D.C. supply voltages in addition to the input signal from the transducer 14. For example, many recorders require D.C. voltages of +21 volts and −21 volts. However, the D.C. voltage available from the recorder's power supply, indicated generally at 24, is often only 12 volts. Therefore in this event, that D.C. supply voltage is usually converted to alternating voltage by an inverter transformer 22 and then converted back to a direct voltage of the desired magnitude by a rectifier 26. Thus the inverter 22, rectifier 26 and all of the other components of the thermographic recorder described thus far are conventional and form no part of the present invention.

Applicant's advance here is in the mode of heating the resistance element R in the stylus 10 to the required temperatures that will cause the stylus to form a uniformly distinct trace on chart strip S at all the usual chart speeds. Instead of connecting the stylus to the D.C. supply by way of a potentiometer as is done conventionally and which is imprecise and wasteful of energy, the stylus heating element R is connected by way of a selector switch shown generally at 30 to a small auxiliary winding indicated at 32 added to the secondary of inverter transformer 22.

Preferably, the transformer is a "cross-type" pot core transformer whose winding 32 has one or more taps 34. In the illustrated embodiment there are five such taps 34. One end of the winding is connected via a common lead $L_c$ to one terminal of the stylus resistance element R. Winding taps 34 are connected by different leads $L_1$ to $L_5$ to separate switching terminals of switch 30, the arm 30a of switch 30 being connected to the opposite end of the stylus heating element R.

Thus when transformer 22 is energized, an electrical current is induced in auxiliary winding 32. Consequently, there is a potential drop across the entire winding, i.e. between the common lead $L_c$ and lead $L_5$ and lesser potentials exist between that common lead and leads $L_1$ to $L_4$ connected to the various taps 34 on that winding. Thus by positioning the switch arm 30a to that connection is made to one or another of those taps, different currents may be applied to resistance element R as will cause that element to heat the stylus to the different temperatures required for the different speeds of the chart paper past the stylus.

Thus in the illustrated recorder, the winding 32 consists of two turns and there is a tap 34 at each quarter turn connected by an electrical lead to one of five different terminals of switch 30. This arrangement permits the user to apply voltages of 2, 3, 4, 5 or 6 volts to resistance element R by appropriately positioning switch arm 30a. These voltages suffice to cause element R to heat the stylus to precisely the proper temperatures to provide a distinct, uniform chart trace at the five different chart speeds often available on recorders of this general type, (e.g. 1, 5, 10, 25, 50, mm./sec.).

Switch 30 is specifically illustrated as being a separate manual switch. However, it will be appreciated that the switch could very well be ganged with the five position switch controlling chart spaced so that the stylus 10 will automatically be heated to the correct temperature for the selected chart speed.

Since the small winding 32 has essentially zero resistance, there is no energy dissipation when less than the maximum voltage is selected for application to the stylus element R as is the case with prior conventional arrangements of this general type. Consequently, my variable temperature stylus is highly efficient. Further, the switch selection of the winding tap provides precise control of the voltage applied to heating element R so that the temperature of the stylus can be controlled more precisely than is the case with prior arrangements using potentiometers which can change their resistive characteristics because of wiper arm wear and the like.

Yet with all these advantages, because of its simplicity, the present variable temperature stylus should not appreciably increase the overall cost of thermographic recorders. Therefore, it should find wide application.

It will thus be seen that the objects set forth above, among those made apparent from the preceding description, are efficiently attained, and since certain changes may be made in the construction set forth without departing from the scope of the invention, it is intended that all matter contained in the above description or shown in the accompanying drawing shall be interpreted as illustrative and not a limiting sense.

It will also be understood that the following claims are intended to cover all the generic and specific features of the invention herein described.

I claim:

1. A variable temperature recording stylus comprising
   A. a stylus heating element for hating the stylus,
   B. an electrical inverter transformer having a primary and a secondary,
   C. an auxiliary winding in the transformer secondary, and
   D. means for electrically connecting the auxiliary winding to the stylus heating element.

2. The stylus defined in claim 1 wherein
   A. the auxiliary winding has one or more taps along its length, and
   B. the connecting means includes a plural position selector switch having separate switching terminals connected to different ones of the taps and having a switching arm connected to the heating element.

3. In a thermographic recorder of the type having a stylus, means for heating the stylus, a pen motor for moving the stylus, an amplifier for applying a driving signal to the pen motor, an electrical inverter transformer for converting a first D.C. voltage to an A.C. voltage and a rectifier for converting the A.C. voltage to a second D.C. voltage for application to the amplifier, the improvement comprising:

A. an auxiliary winding in the transformer,
B. a one or more taps along the length of the auxiliary winding,
C. a plural position selector switch having different switching terminals and switching arm,
D. means for electrically connecting one end of the auxiliary winding to the heating means,
E. means for electrically connecting each of said taps to a different one of the switching terminals, and
F. means for electrically connecting the switching arm to the stylus heating means.

4. The recorder defined in claim 3 wherein the current induced in the auxiliary winding of the inverter produces a maximum of 6 volts across the winding.

5. The recorder defined in claim 4 wherein there are five taps on the auxiliary winding and the voltages picked off the taps vary by 1 volt.

6. The recorder defined in claim 3 wherein said transformer is a "cross-type" pot core transformer.

* * * * *